United States Patent
Glazberg et al.

(10) Patent No.: US 8,019,824 B2
(45) Date of Patent: Sep. 13, 2011

(54) REMOTELY OPERATING COMPUTER SOFTWARE APPLICATIONS USING LOW BANDWIDTH

(75) Inventors: Ziv Glazberg, Haifa (IL); Ishai Rabinovitz, Haifa (IL); Shmuel Ur, Shorashim (IL)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 11/456,889

(22) Filed: Jul. 12, 2006

(65) Prior Publication Data
US 2008/0016175 A1 Jan. 17, 2008

(51) Int. Cl.
*G06F 15/16* (2006.01)
(52) U.S. Cl. .......................... 709/208; 709/209; 709/210
(58) Field of Classification Search .......... 709/208–211, 709/217–219
See application file for complete search history.

(56) References Cited

U.S. PATENT DOCUMENTS

| | | | |
|---|---|---|---|
| 4,682,957 A | 7/1987 | Young et al. | |
| 5,844,553 A | 12/1998 | Hao et al. | |
| 6,665,835 B1 | 12/2003 | Gutfreund et al. | |
| 7,526,525 B2 * | 4/2009 | Hagale et al. | 709/204 |
| 2003/0191805 A1 * | 10/2003 | Seymour et al. | 709/204 |

OTHER PUBLICATIONS

Russell, "Build an iTunes Remote Control", Mar. 1, 2005, published on MacDevCenter (www.macdevcenter.com).*
Phillips, "How-to: Control iTunes from any web browser", posted Dec. 13, 2005 4:22pm on www.engadget.com.*
McNulty, "PSP iTunes Remote", Nov. 21, 2005 11:00pm, http://www.tuawm.com/2005/11/21/psp-itunes-remote/, p. 1-13.*
Phillips, "How-To: Control iTunes from any web browser", Dec. 13, 2005 4:22pm, http://www.engadget.com/2005/12/13/how-to-control-itunes-from-any-web-browser/, p. 1-6.*
Sung Been Cho et al. "A distributed object sharing system for CSCW", Journal of KISS(C) (Computing Practices), v 5, n 3, Jul. 1999, p. 326-35 (Abstract only).

* cited by examiner

*Primary Examiner* — David Lazaro
*Assistant Examiner* — Edward J Kim

(57) ABSTRACT

A system for remote operation of the computer software applications, the system including a remote application controller for associating a master control with both a master application and a master action associated with the master application, and a command receiver/implementer for associating a slave control with both a slave application and a slave action associated with the slave application, where the remote application controller commands the command receiver/implementer to perform the slave action in connection with the performing of the master action.

19 Claims, 3 Drawing Sheets

REMOTELY OPERATING COMPUTER SOFTWARE APPLICATIONS USING LOW BANDWIDTH

FIELD OF THE INVENTION

The present invention relates in general to controlling computer software applications, and particularly to remote operation of computer software applications.

BACKGROUND OF THE INVENTION

Computer software applications running on a computer at one location may be remotely controlled in various ways. For example, a computer-based slide presentation may be presented to multiple computer users at multiple locations by a presenter who is at yet another location by establishing a telephone conference between the presenter and each of the computer users participating in the slide presentation. In one scenario, the slide presentation is distributed to each of the participating computer users in advance of the presentation. When the presentation begins, each participating computer user displays the slide presentation by executing slide presentation software on the user's compute. The presenter then tells the participants when to activate presentation features, such as when to click on slide objects to activate presentation effects, or when to advance to the next slide. Unfortunately, such presentations are difficult to synchronize, as the participants typically do not respond to the presenter's instructions at the same moment, which may affect the timing of the presenter relative to the timing of each participant's slide presentation, and the quality of the presentation as a result. Furthermore, this solution presumes that all participants use the same slide presentation software, and does not address the situation where one participant uses slide presentation software while another participant uses software to view a PDF file of the same slide presentation. In another scenario, the slide presentation is not distributed to each of the participating computer users. Rather, whatever appears on the presenter's computer display is transmitted to each participant's computer and duplicated on each participant's computer display. Unfortunately, the high-bandwidth nature of this solution also suffers from synchronization problems due to differences in bandwidth among the participants. Participants also typically cannot control the duplicated display, such as by changing the size of an application window. Furthermore, as the display data is transferred over the network, controls must be implemented to prevent unauthorized individuals from accessing and viewing the data.

SUMMARY OF EMBODIMENTS OF THE INVENTION

Embodiments of the present invention disclose a novel system and method for remote operation of computer software applications.

In one aspect of the present invention a system is provided for remote operation of computer software applications, the system including a remote application controller operative to associate a master control with both a master application and a master action associated with the master application, and a command receiver/implementer operative to associate a slave control with both a slave application and a slave action associated with the slave application, where the remote application controller is operative to command the command receiver/implementer to perform the slave action in connection with the performing of the master action.

In another aspect of the present invention a method is provided for remote operation of computer software applications, the method including associating a master control with both a master application and a master action associated with the master application, associating a slave control with both a slave application and a slave action associated with the slave application, and providing a command to perform the slave action in connection with the performing of the master action.

In another aspect of the present invention a computer program is provided embodied on a computer-readable medium, the computer program including a first code segment operative to associate a master control with both a master application and a master action associated with the master application, a second code segment operative to associate a slave control with both a slave application and a slave action associated with the slave application, and a third code segment operative to providing a command to perform the slave action in connection with the performing of the master action.

BRIEF DESCRIPTION OF THE DRAWINGS

Embodiments of the present invention will be understood and appreciated more fully from the following detailed description taken in conjunction with the appended drawings in which.

DETAILED DESCRIPTION OF EMBODIMENTS OF THE INVENTION

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Figure 1:
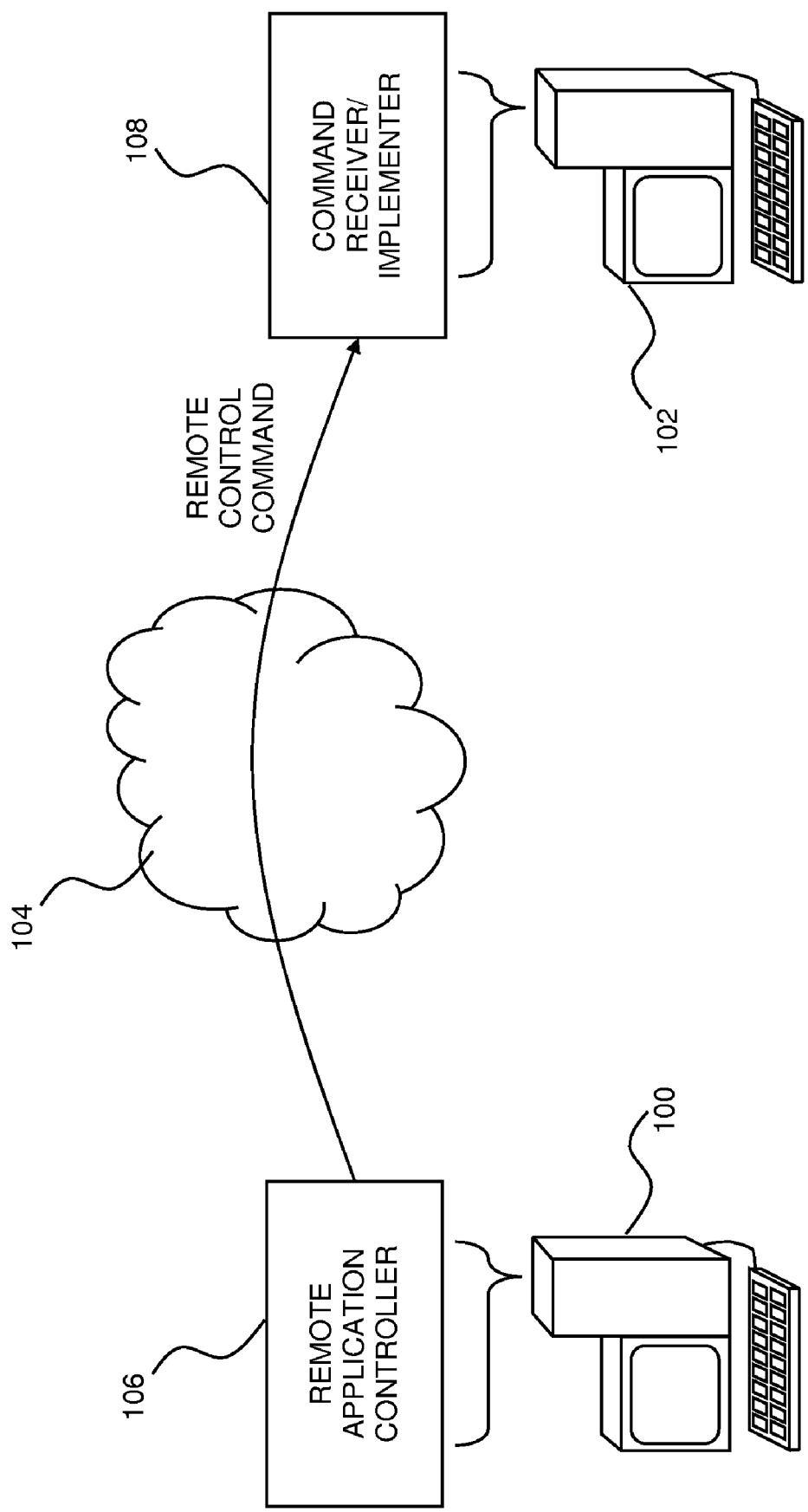
FIG. 1 is a simplified conceptual flow illustration of a system for remote operation of computer software applications, constructed and operative in accordance with an embodiment of the present invention.

Reference is now made to FIG. 1, which is a simplified conceptual illustration of a system for remote operation of computer software applications, constructed and operative in accordance with an embodiment of the present invention. In the system of FIG. 1, two computers 100, 102 are shown connected to a network 104, such as the Internet. Computers 100, 102 may be any combination of known computing devices capable of executing computer software applications, such as personal computers, handheld computers, cellular telephones, etc. Computer 100 is configured with a remote application controller 106 for controlling the execution of computer software applications running on computer 102, as is described in greater detail hereinbelow. Computer 102 is configured with a command receiver/implementer 108 for receiving commands from remote application controller 106 and controlling computer software applications running on computer 102 in accordance with received commands, as is also described in greater detail hereinbelow.

Figure 2:
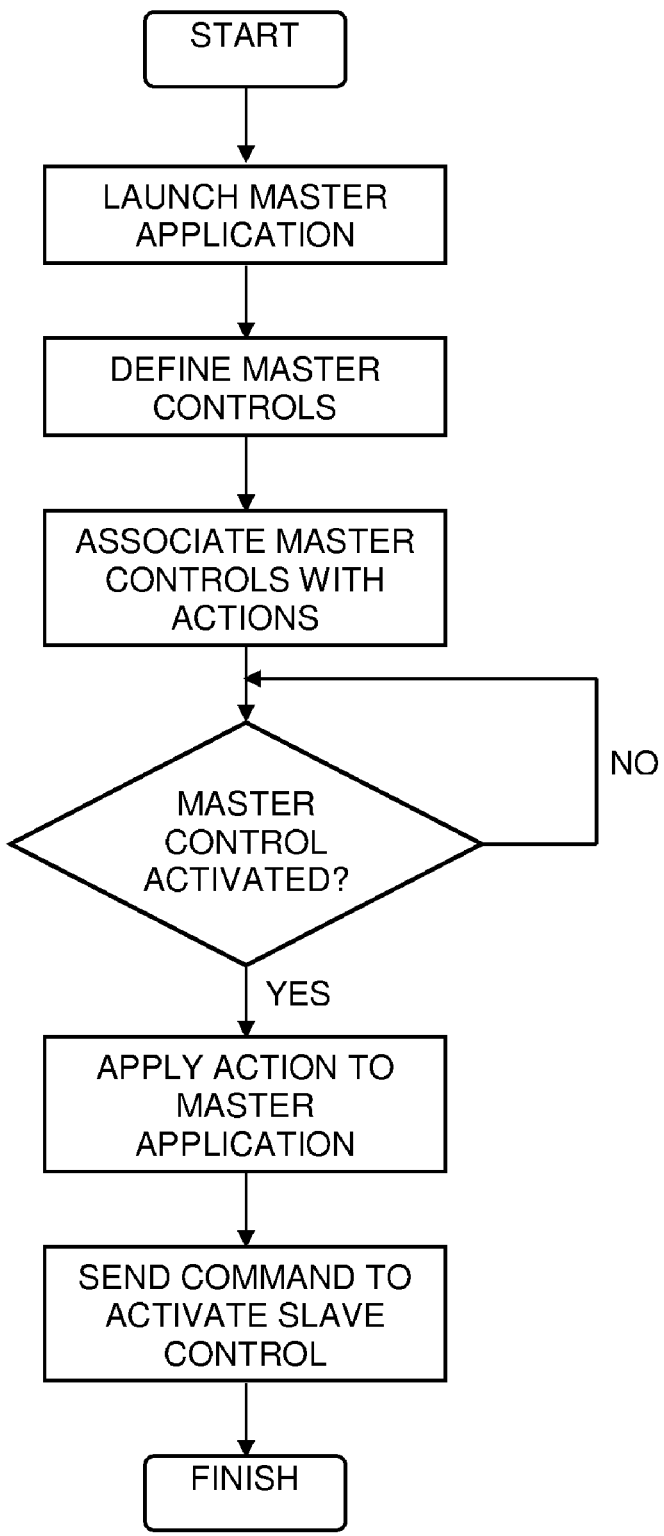
FIG. 2 is a simplified flowchart illustration of an exemplary method of operation of remote application controller 106 of FIG. 1, operative in accordance with an embodiment of the present invention.

Reference is now made to FIG. 2, which is a simplified flowchart illustration of an exemplary method of operation of remote application controller 106 of FIG. 1, operative in accordance with an embodiment of the present invention. In the method of FIG. 2, remote application controller 106 is used to launch a computer software application on computer 100, now referred to as the "master" application. Controller 106 is then used to define one or more controls, which may be associated with graphical user interface (GUI) objects such as buttons, now referred to as "master" controls, each of which is then associated with an action, now referred to as a "master" action, that is to be performed on the master application when then associated master control is activated within controller 106. Thus, for example, during configuration of controller 106 for use with a slide presentation application on computer 100, a configuration window may be provided to a user at computer 100 in which a button labeled "Next Slide" is defined and associated with sending a "page down" keystroke to the slide presentation application.

Figure 3:
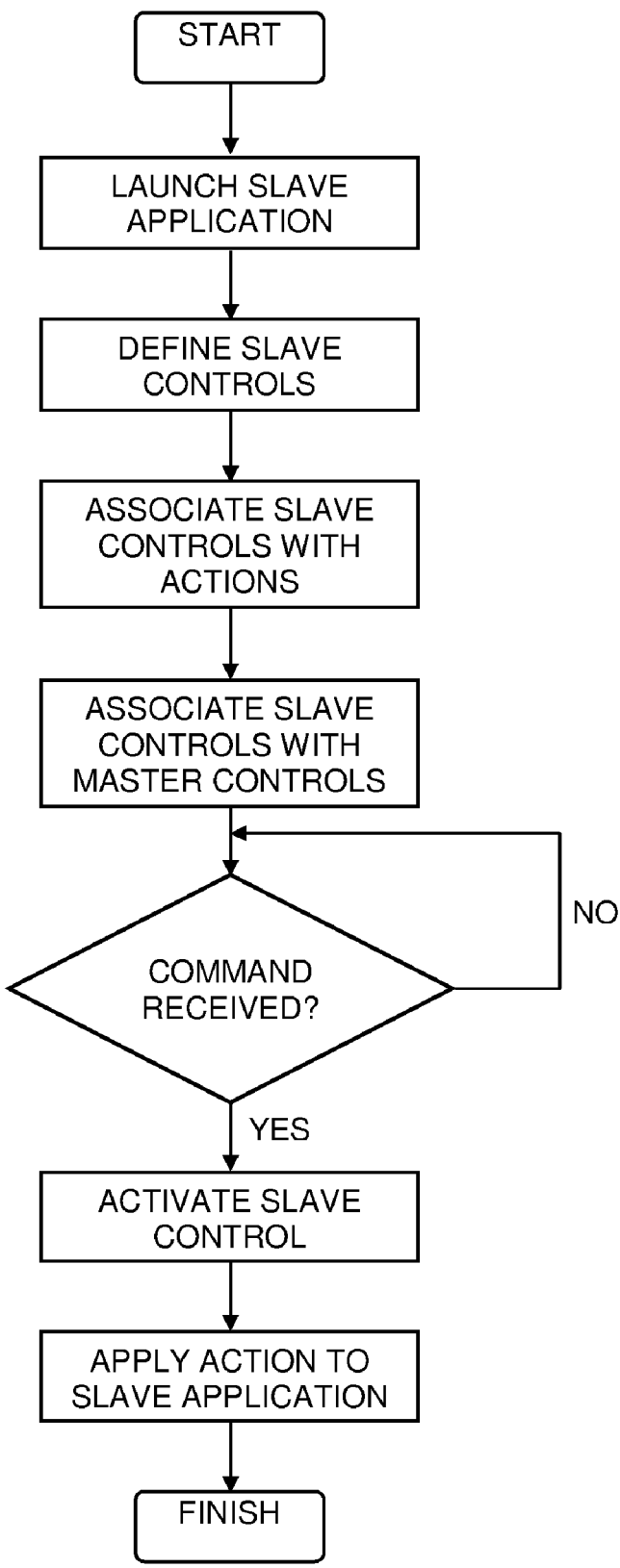
FIG. 3 is a simplified flowchart illustration of an exemplary method of operation of command receiver/implementer 108 of FIG. 1, operative in accordance with an embodiment of the present invention.

Additional reference is now made to FIG. 3, which is a simplified flowchart illustration of an exemplary method of operation of command receiver/implementer 108 of FIG. 1, operative in accordance with an embodiment of the present invention. In the method of FIG. 3, command receiver/implementer 108 is used to launch a computer software application on computer 102, now referred to as the "slave" application. The slave application of computer 102 may be identical to the master application of computer 100, such as where both master and slave applications are instances of the same slide presentation application, or they may be instances of different applications, such as where the master application is a slide presentation application, while the slave application is a PDF viewer for viewing a PDF version of a slide presentation. Command receiver/implementer 108 is then used to define one or more controls, which may be associated with GUI objects, now referred to as "slave" controls, each of which is then associated with an action, now referred to as a "slave" action, that is to be performed on the slave application when then control is activated within command receiver/implementer 108. Each slave control is then associated with a master control of controller 106, such as by assigning an identifier to a master control, and assigning the same identifier to the slave control.

Each slave control action is preferably defined to correspond to its associated master control action so as to provide a desired corresponding behavior. Thus, in the present example, where the master and slave applications are copies of the same slide presentation application, a slave "Next Slide" control is defined to correspond to the master "Next Slide" control, where both controls send a "page down" keystroke to its corresponding slide presentation application. Alternatively, where the master application is a slide presentation application, while the slave application is a PDF viewer for viewing a PDF version of a slide presentation, a slave "Next Page" control may be defined to correspond to the master "Next Slide" control, where the master controls sends a "page down" keystroke to its corresponding slide presentation application, while the slave control sends a "right-arrow" keystroke to its corresponding PDF viewer application to achieve the same net effect of advancing to the next page on which the next slide appears.

In preparation for a remote control session, the master and slave applications are provided with access to corresponding data sets which may be identical (e.g., copies of the same slide presentation) or different representations of the same data (e.g., a slide presentation and a PDF file of the slide presentation). Once remote application controller 106 and the master application are running on computer 100, and command receiver/implementer 108 and the slave application are running on computer 102, and once one or more master controls are defined for the master application and associated with one or more corresponding slave controls defined for the slave application, remote application controller 106 may be used to control the slave application as follows. Upon activation of a master control on computer 100, remote application controller 106 sends, via network 104 to command receiver/implementer 108 at computer 102, a command to activate its corresponding slave control. The command may use any known command protocol, and may simply be the master control identifier itself. Upon receipt of the command, receiver/implementer 108 activates the indicated slave control, which performs its associated action on the slave application. Thus, in the present example, when a presenter of a slide presentation at computer 100 wishes to advance to the next slide, the presenter activates the "Next Slide" master control, whereupon remote application controller 106 sends a "page down" keystroke to its corresponding slide presentation application, as well as a command to command receiver/implementer 108 at computer 102 instructing command receiver/implementer 108 to activate the corresponding slave control, thereby controlling the slave application to advance to the next slide/page.

The present invention may be adapted in various ways, including:

1. Master and slave controls may be located anywhere on their respective computer displays, including on top of or near corresponding controls within the interfaces of their respective master/slave applications, such as where a master "Page Down" control is placed on top of the "Page Down" control of the master application interface. Alternatively, master and slave controls may be located on top of or near applications other than their respective master/slave applications, such as an instant messaging application.
2. Different actions may be assigned to a single slave control, such as to accommodate commands from different corresponding master controls on different computers. For example, where the master and slave applications both provide a view of text file, a master "Page Down" control on one computer might means advancing the text by 15 lines, while on another computer it means advancing the text by 25 lines. The corresponding slave control action will depend both on which master control is chosen, as well as where the command originated (e.g., the command includes an originator ID that is known to command receiver/implementer 108).
3. Master and slave controls need not be represented by GUI objects. For example, a master control may be defined as an instruction to remote application controller 106 to capture a particular type of master application event, where the event is defined as part of a master action that is associated with the master control. Thus, a master "page down" control may be defined, thereby tasking remote application controller 106 to detect when the master application performs a "page down" action, whereupon remote application controller 106 sends a command to command receiver/implementer 108 to perform a corresponding action on the slave application that has been defined in connection with a slave control, which may itself be defined as an instruction to command receiver/implementer 108 to detect such a command.

4. Configuration information for remote application controller 106 and command receiver/implementer 108 may be stored in a data file for later reuse and/or sharing among different users.
5. Either or both of computers 100 and 102 may be configured with both remote application controller 106 and command receiver/implementer 108, allowing for both master and slave controls to be defined on a computer for the same application or different applications that run at different times or concurrently. A master control may also be defined as a slave control, and vice versa, providing two-way control of corresponding applications on different computers.
6. Where a slave controls is represented by a GUI object, the object need not be visible during operation of the slave application.

It will be appreciated that the present invention may be used to remotely control various types of computer applications. For example:

A media player playing a video clip on one computer may be used to control a different brand of media player to play the same video clip on another computer.

A computer-based game that is not inherently network-enabled may be played over a computer network. Thus, a non-networked version of two-player Tic-Tac-Toe may be played by two players on two different computers by setting up master controls on the "X" player's computer to correspond to the "X" along with corresponding "X" slave controls on the "Y" player's computer, as well as master controls on the "Y" player's computer to correspond to the "Y" along with corresponding "Y" slave controls on the "X" player's computer.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. A system for operation of computer software applications, the system operative in a computerized environment comprising at least a processor, the computerized environment comprising first computer, a second computer and a communication channel between the first computer and the second computer:
    wherein said first computer is adapted to:
        dynamically associate a master control with a master action of a master application, the master application being executed by the first computer, wherein said dynamically associating is based on a first modifiable configuration indicating to apply the master control to the master action;
        in response to a first input from the first user to the master control:
            the master control is configured to generate a second input and provide the second input to the master application, wherein the first modifiable configuration defines the second input, wherein the second input is specifically configured to operate the master action in the master application, whereby the first computer is operative to execute the master action; and
            the first computer is adapted to send a command to a slave control in the second computer over the communication channel;
    wherein said second computer is adapted to:
        dynamically associate the slave control with a slave action of a slave application, the slave application being executed by the second computer, wherein said dynamically associating is based on a second modifiable configuration indicating to apply the slave control to the slave action;
        activate the slave control in response to receiving the command in the second computer;
        wherein the slave control is configured to generate a third input and provide the third input to the slave application in response to the activation of the slave control, wherein the second modifiable configuration defines the third input, wherein the third input specifically configured to operate the slave action in the slave application, whereby the second computer is operative to execute the slave action;
    wherein said second computer is further adapted to:
        dynamically associate a second master control with a second master action of the slave application based on the second modifiable configuration;
        in response to receiving a fourth input, the second master control:
            generate a fifth input and provide the fifth input to the slave application, wherein the second modifiable configuration defines the fifth input, wherein the fifth input is specifically configured to operate the second master action in the slave application whereby the second computer is operative to perform the second master action; and
            the second computer is adapted to send a second command from the second computer to the first computer over the communication channel;
    wherein said first computer is further adapted to:
        dynamically associate a second slave control with a second slave action of the master application, based on the first modifiable configuration selected by the first user;
        in response to receiving the second command in the first computer, the second slave control is configured to generate a sixth input and providing the sixth input to the master application, wherein the first modifiable selection defines the sixth input, wherein the sixth input is specifically configured to operate the second slave action in the master application, whereby the first computer is operative to perform the second slave action; and
    whereby providing a user-configurable two-way interface between the master application and the slave application.

2. The system according to claim 1,
    wherein said master control is associated with a Graphical User Interface object, wherein the Graphical User Interface object is defined by said master control and operatively coupled to the master control;
    wherein the first computer comprising a computer display operative to display said Graphical User Interface object;
    wherein said master control is responsive to an activation of said Graphical User Interface object; and
    whereby the first user is able to interact with the first computer using the Graphical User Interface object of said master control instead of an interface of the master application and nonetheless invoke operation of the master action.

3. The system according to claim 1, wherein the master application and the slave application are instances of different applications, and whereby the system provides for a two-way user-configurable network protocol between different applications which enables the different applications to be operatively coupled without altering functionality of each of the different applications.

4. The system according to claim 1, wherein the master application and the slave application are instances of a same application.

5. The system of claim 1, wherein the slave application and the master application are not inherently network-enabled; and whereby the non-network-enabled slave and master applications are configured to interact over the communication channel based on the modifiable configurations.

6. The system of claim 1, wherein the further computerized environment further comprises a third computer and a second communication channel between the first computer and the third computer, the method further comprising:
   dynamically associating a second slave control with a second slave action of a second slave application, the second slave application being executed by the third computer, wherein said dynamically associating is based on a third modifiable configuration selecting the second slave action out of any action of any application, wherein the third modifiable configuration defines a fourth input specifically configured to operate the second slave action in the second slave application;
   in response to receiving the command in the third computer, activating the second slave control; and
   in response to the activation of the second slave control, the second slave control generating the fourth input and providing the fourth input to the second slave application, whereby the second computer executing the slave action;
   wherein the second slave application is different than the slave application; and
   whereby the master control controls functionalities of different slave applications.

7. A method for operation of computer software applications in a computerized environment comprising a first computer, a second computer, and communication channel between the first computer and the second computer, the method comprising:
   dynamically associating a master control with a master action of a master application, the master application being executed by the first computer, wherein said dynamically associating is based on a first modifiable configuration indicating to apply the master control to the master action;
   in response to a first input from the first user to the master control:
      the master control generating a second input and providing the second input to the master application, wherein the first modifiable configuration defines the second input, wherein the second input is specifically configured to operate the master action in the master application, whereby the first computer is executing the master action;
      sending a command to a slave control in the second computer over the communication channel;
   dynamically associating the slave control with a slave action of a slave application, the slave application being executed by the second computer, wherein said dynamically associating is based on a second modifiable configuration indicating to apply the slave control to the slave action;
   in response to receiving the command in the second computer, activating the slave control;
   in response to the activation of the slave control, the slave control generating a third input and providing the third input to the slave application, wherein the second modifiable configuration defines the third input, wherein the third input specifically configured to operate the slave action in the slave application, whereby the second computer is executing the slave action:
   the second computer dynamically associating a second master control with a second master action of the slave application based on the second modifiable configuration;
   in response to receiving a fourth input, the second master control:
      generating a fifth input and providing the fifth input to the slave application, wherein the second modifiable configuration defines the fifth input, wherein the fifth input is specifically configured to operate the second master action in the slave application whereby the second computer performing the second master action;
      the second computer sending a second command from the second computer to the first computer over the communication channel;
   the first computer dynamically associating a second slave control with a second slave action of the master application, based on the first modifiable configuration selected by the first user;
   in response to receiving the second command in the first computer, the second slave control generating a sixth input and providing the sixth input to the master application, wherein the first modifiable selection defines the sixth input, wherein the sixth input is specifically configured to operate the second slave action in the master application, whereby the first computer performing the second slave action; and
   whereby providing a user-configurable two-way interface between the master application and the slave application.

8. The method according to claim 7, wherein the master application and the slave application are instances of different applications, and whereby the method provides for a two-way user-configurable network protocol between the different applications which enables the different applications to be operatively coupled without altering functionality of each of the different applications.

9. The method according to claim 7,
   wherein either the master action and the second slave action are different or the slave action and the second master action are different; and
   whereby providing a user-configurable two-way asymmetric interface between the master application and the slave application, wherein the asymmetric interface enables either of the first computer or the second computer to control an aspect of the master and slave applications that the other computer does not control.

10. The method of claim 9, whereby a configurable asymmetric two-way interface is provided between the master application and the slave application, wherein the two-way interface simulates users providing input to the master and slave applications, wherein the asymmetric two-way interface is configured based on user selections defining the input to be simulated, and whereby the applications are unaware of the two-way interface.

11. The method according to claim 7 further comprises:
wherein the master action and the second slave action are the same action;
wherein the slave action and the second master action are the same action; and
whereby providing a configurable two-way symmetric interface between the master application and the slave application, wherein the symmetric interface enables the first computer to control an aspect of the master and slave applications and the second computer to control the aspect of the master and slave applications.

12. The method of claim 11, whereby a configurable symmetric two-way interface is provided between the master application and the slave application, wherein the two-way interface simulates users providing input to the master and slave applications, wherein the symmetric two-way interface is configured based on user selections defining the input to be simulated, and whereby the applications are unaware of the two-way interface.

13. A computer program product comprising:
a non-transitory computer readable medium;
a first program instruction operative to dynamically associate a master control with a master action of a master application; wherein the master application is operative to be executed by a first computer, wherein the dynamic association is based on a first modifiable configuration indicating to apply the master control to the master action;
a second program instruction operative, in response to a first input from the first user to the master control to:
generate a second input and provide the second input to the master application, wherein the first modifiable configuration defines the second input, wherein the second input is specifically configured to operate the master action in the master application; and
to send a command to a slave control in a second computer, wherein the command is sent over a communication channel from the first computer to the second computer;
a third program instruction operative to dynamically associate the slave control with a slave action of a slave application, wherein the dynamic association is based on a second modifiable configuration indicating to apply the slave control to the slave action, wherein the slave application is operative to be executed by the second computer;
a fourth program instruction operative, in response to receiving the command by the slave control, to generate a third input and provide the third input to the slave application, wherein the second modifiable configuration defines the third input, wherein the third input specifically configured to operate the slave action in the slave application, whereby the second computer is operative to execute the slave action in response to receiving the command;
a fifth program instruction operative to dynamically associate a second master control with a second master action of the slave application based on the second modifiable configuration;
a sixth program instruction operative, in response to receiving a fourth input to:
generate a fifth input and provide the fifth input to the slave application, wherein the second modifiable configuration defines the fifth input, wherein the fifth input is specifically configured to operate the second master action in the slave application whereby the second computer performing the second master action; and
to cause the second computer to send a second command from the second computer to the first computer over the communication channel;
a seventh program instruction operative to dynamically associate a second slave control with a second slave action of the master application, based on the first modifiable configuration selected by the first user;
an eighth program instruction operative, in response to receiving the second command in the first computer, to cause the second slave control to generate a sixth input and to provide the sixth input to the master application, wherein the first modifiable selection defines the sixth input, wherein the sixth input is specifically configured to operate the second slave action in the master application, whereby the first computer performing the second slave action;
wherein said first, second, third, fourth, fifth, sixth, seventh and eighth program instructions are stored on said non-transitory computer readable medium; and
whereby said first, second, third, fourth, fifth, sixth, seventh and eighth program instructions provide a user-configurable two-way interface between the master application and the slave application.

14. The computer program product according to claim 13, wherein the master application and the slave application are instances of different applications, and whereby the computer program product provides for a user-configurable network interface between the different applications which enables the different applications to be operatively coupled without altering functionality of each of the different applications.

15. The computer program product of claim 13, wherein either the master action and the second slave action are different or the slave action and the second master action are different; and
whereby said computer program product provides a user-configurable two-way asymmetric interface between the master application and the slave application, wherein the asymmetric interface enables either of the first computer or the second computer to control an aspect of the master and slave applications that the other computer does not control.

16. The computer program product of claim 15, whereby said computer program provides a configurable asymmetric two-way interface is between the master application and the slave application, wherein the two-way interface simulates users providing input to the slave and master applications, wherein the asymmetric two-way interface is configured based on user selections defining the input to be simulated, and whereby the applications are unaware of the two-way interface.

17. The computer program product of claim 13, wherein said computer program product providing a configurable two-way symmetric interface between the master application and the slave application, wherein the symmetric interface enables the first computer to control an aspect of the master and slave applications and the second computer to control the aspect of the master and slave applications.

18. The computer program product of claim 17, wherein said computer program product providing a configurable symmetric two-way interface between the master application and the slave application, wherein the two-way interface simulates users providing input to the master and slave applications, wherein the symmetric two-way interface is configured based on user selections defining the input to be simulated, and whereby the applications are unaware of the two-way interface.

19. The computer program product of claim 13, wherein the master application and the slave application are instances of different applications, and whereby the computer program product provides for a two-way user-configurable network protocol between different applications which enables the different applications to be operatively coupled without altering functionality of each of the different applications.

* * * * *